United States Patent

[11] 3,554,262

| [72] | Inventor | Harry R. Swanson<br>Akron, Ohio |
|---|---|---|
| [21] | Appl. No. | 757,374 |
| [22] | Filed | Sept. 4, 1968 |
| [45] | Patented | Jan. 12, 1971 |
| [73] | Assignee | The Goodyear Tire & Rubber Company<br>Akron, Ohio<br>a corporation of Ohio |

[54] METHOD AND APPARATUS FOR FOLDING TIRES
7 Claims, 4 Drawing Figs.

[52] U.S. Cl. .................................................. 157/1,
18/17
[51] Int. Cl. ............................................. B60c 25/00
[50] Field of Search .......................................... 157/1;
18/17K, 17W

[56] References Cited
UNITED STATES PATENTS

| 2,743,480 | 5/1956 | Frank............................ | 18/17 |
| 2,970,342 | 2/1961 | Frohlich et al................. | 18/17 |
| 3,347,964 | 10/1967 | Sidles........................... | 18/17X |

*Primary Examiner*—Granville Y. Custer, Jr.
*Attorneys*—M. William Goodwin and F. W. Brunner ABSTRACT: A method and apparatus for folding the sidewalls of a foldable tire under the tread portion of the tire. The apparatus comprises two axially opposed bead-engaging members which engage the beads of a cylindrical tire and force them axially toward each other. The sidewalls of the tire are backed up by plates which cause the sidewalls to fold under the tread. Pressurized air is applied to the cavity of the tire concurrently with the movement of the bead-engaging members to expand the tread slightly and prevent it from wrinkling.

INVENTOR.
HARRY R. SWANSON

INVENTOR.
HARRY R. SWANSON
BY M William Goodwin
ATTORNEY

METHOD AND APPARATUS FOR FOLDING TIRES

The foregoing abstract is not to be taken as limiting the invention of this application, and in order to understand the full nature and extent of the technical disclosure of this application, reference must be made to the accompanying drawings and the following detailed description.

The invention relates to the folding of pneumatic tires and is particularly useful in the folding of a generally cylindrically cured, foldable tire.

The conventional tires of today are cured in the familiar toroidal shape. However, one construction of a foldable tire is not cured in a toroidal shape but rather, is cured in the substantially cylindrical shape in which it was built. Following curing of the tire, it is desirable to fold the tire into a configuration wherein the sidewalls are disposed beneath and generally between the lateral edges of the tread of the tire.

It is an object of this invention to provide a novel method and apparatus for folding a generally cylindrically cured foldable tire of the type described into the configuration described.

Other objects will be part obvious, and in part pointed out more in detail hereinafter.

Figure 1:
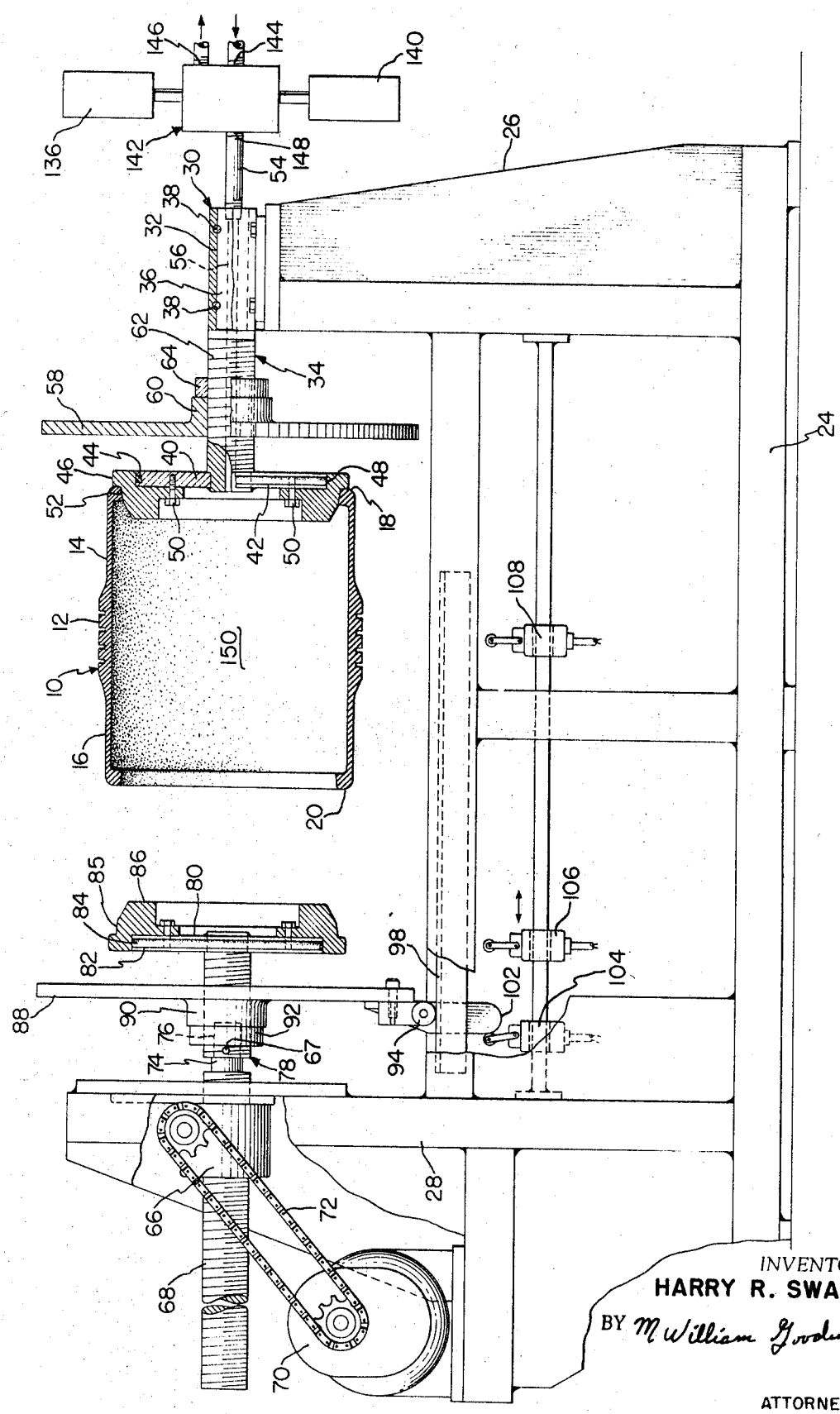
FIG. 1 is a side elevational view of a tire folding apparatus constructed in accordance with the invention.
Figure 2:
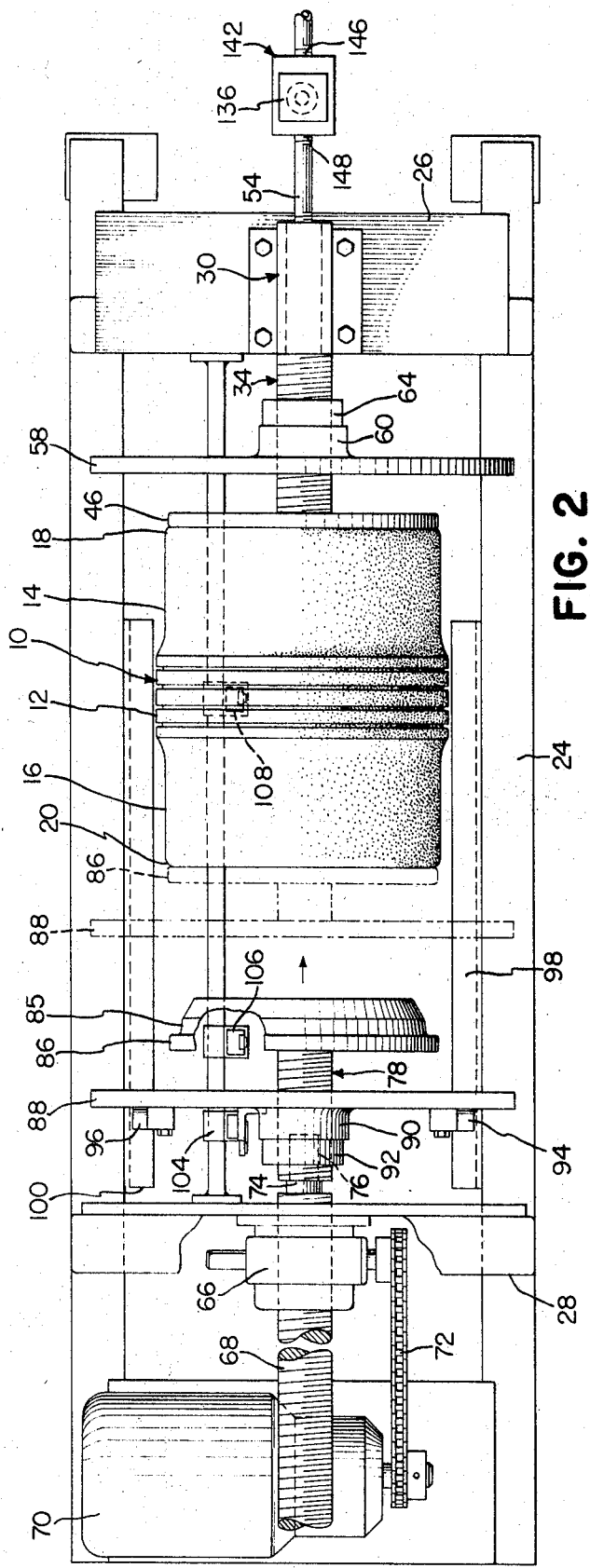
FIG. 2 is a top view of the apparatus of FIG. 1.
Figure 3:
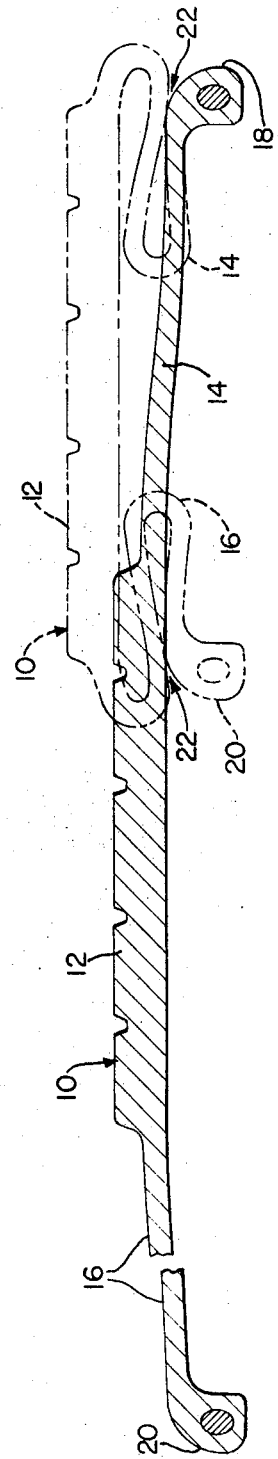
FIG. 3 is a sectional view of a foldable tire illustrating the various stages of the tire folding method according to the invention.

As shown in the drawings, and particularly FIGS. 1 to 3, a foldable tire of the type with which the apparatus of this invention is concerned is generally shown in solid line at 10. The tire has been cured in a substantially cylindrical shape and comprises a cylindrical tread area 12, generally cylindrical sidewall areas 14 and 16 concentric with the tread 12, and beads 18 and 20 at the outer ends of the sidewall portions. The sidewalls 14 and 16 and the tread area 12 are so constructed and are sufficiently flexible to permit the sidewalls to be folded to the configuration shown in dotted lines in FIG. 3 wherein each sidewall has between its bead and the tread a reentrant curvature generally shown at 22 which extends circumferentially of the tire 10 and lies concentrically of and underneath the tread 12. When the tire 10 is folded, as shown and described, it will be observed that the tread 12 will have an outer diameter which is not substantially greater than the diameter of the beads 18 and 20 of the tire, and the axial width of the tire will not be substantially greater than the normal maximum distance between the outer edges of the bead portions of the tire.

With reference to FIGS. 1 and 2 of the drawings, an apparatus constructed in accordance with this invention for folding a tire of the type described comprises a base 24 on which are fixably mounted a pair of vertically extending and horizontally spaced apart support members 26 and 28. A block 30 is fixably mounted on the upper end of the support member 26 and has an opening or bore 32 extending horizontally therethrough and in which is received one end of a shaft 34. The shaft 34 has a reduced diameter portion 36 which is receivable within the block 30 and is fixed relative to the block 30 by suitable means such as dowel pins 38. A disc 40 is fixed on the inner end of the shaft 34 coaxially with the shaft 34 and is provided with an annular recess 42 in its outer peripheral surface concentric with the axis of the shaft 34. A suitable sealing member such as an O-ring 44 is received in the recess 42.

A generally annular, ringlike bead-engaging member 46 is supported coaxially on the disc 40. The bead-engaging member 46 is larger in diameter than the disc 40 and is provided with an annular, axially extending, radially inwardly facing shoulder 48 which is disposed concentrically about the outer peripheral surface of the disc 40 and is in engagement with the O-ring 44 to form an airtight seal. The bead-engaging member 46 is demountably attached to the disc 40 by suitable means such as cap screws 50. The bead-engaging member 46 is also provided with an annular bead seat 52 on its outer periphery suitable for airtight engagement with the bead 18 of the tire 10. A pipe 54 is threadably engaged with the outer end of the shaft 34 and communicates with a passage 56 which extends coaxially through the shaft 34.

A sidewall deflector or plate member 58 which, in the embodiment shown, is a round flat plate, is disposed coaxially over the shaft 34 and is located between the bead-engaging member 46 and block 30. The sidewall deflector or plate member 58 has a coaxial, internally threaded hub 60 which is threadably engaged over the threaded inner end portion 62 of the shaft 34. The sidewall deflector or plate member 58 is substantially larger in outer diameter than the bead-engaging member 46 so as to extend substantially radially outwardly beyond the bead-engaging member 46.

The sidewall deflector or plate member 58 can be moved in opposite directions axially of the shaft 34 by threading the hub 60 axially of the shaft 34. A nut 64 is threadably engaged over the shaft 34, between the hub 60 and the block 30 and is engageable with the hub 60 to lock the sidewall deflector or plate member 58 relative to the shaft 34.

A standard jackscrew drive arrangement generally shown at 66 is mounted on the support member 28 and comprises an axially movable jackscrew 68 extending coaxially of the shaft 34. The jackscrew is driven by a suitable drive means which in this particular embodiment includes an electrical motor 70 and chain drive 72. The end 74 of jackscrew 68 nearest the bead-engaging member 46 is reduced in diameter and received in the opening 76 extending coaxially from one end of a shaft 78. The jackscrew 68 is fixed in position relative to the shaft 78 by a dowel pin 67. The shaft 78 extends coaxially of the shaft 34 and is disposed between the support member 28 and bead-engaging member 46.

A disc 80 is fixed coaxially of and on the inner end of the shaft 78. The disc 80, like the disc 40 previously described, is provided with an annular recess 82 on its outer periphery for receiving a suitable sealing member such as an O-ring 84. A bead-engaging member 86 which is similar to the bead-engaging member 46 previously described is mounted on and sealed to the disc 80 in the same manner as the bead-engaging member 46 is mounted on and sealed to the disc 40. A sidewall deflector or plate member 88 is disposed coaxially over the shaft 78 and is disposed between the bead-engaging member 86 and support 28. Sidewall deflector or plate member 88 is provided with a hub 90 on the side of the sidewall deflector or plate member 88 nearest to the support 28. The hub 90 is threaded coaxially over the shaft 78. A nut 92 is also threaded over the shaft 74 and is located between the hub 90 and support 28.

The sidewall deflector or plate member 88 is provided with two rollers 94 and 96 for the purpose of vertically supporting the shaft 78 as it is moved away from the support member 28. The rollers 94 and 96 roll on tracks 98 and 100 which are rigidly mounted on the base 24 and are parallel to the common axis of the shafts 34 and 78. Engagement between the rollers 94 and 96 and tracks 98 and 100 prevent rotation of the sidewall deflector or plate member 88 and limit its movement to axial movement. The bead-engaging member 86 and disc 80 can be rotated to caused the shaft 78 to rotate relative to the hub 90 with which it is threadably engaged thus effecting relative movement of the shaft 78 axially of the sidewall deflector 88. This rotation of the shaft 78 also cause the jackscrew 68 to thread in and out relative to the jackscrew drive 66. By tightly engaging the nut 92 with the hub 90, the shaft 78 and jackscrew 68 will be effectively locked against rotation thus effecting the locking of the sidewall deflector 88 in its adjusted position relative to the shaft 78 and bead-engaging member 86.

A cam or actuator 102 is mounted on the sidewall deflector 88 for movement therewith and for cooperation with switches 104, 106 and 108 suitably supported by the base 24. The switches are aligned parallel to the axis of the shaft 78 so that as the sidewall deflector 88 moves axially with the shaft 78, the cam 102 will successively engage and actuate the switches 104, 106 and 108. The switches 104, 106 and 108 are mounted for adjustment in the direction of movement.

Figure 4:
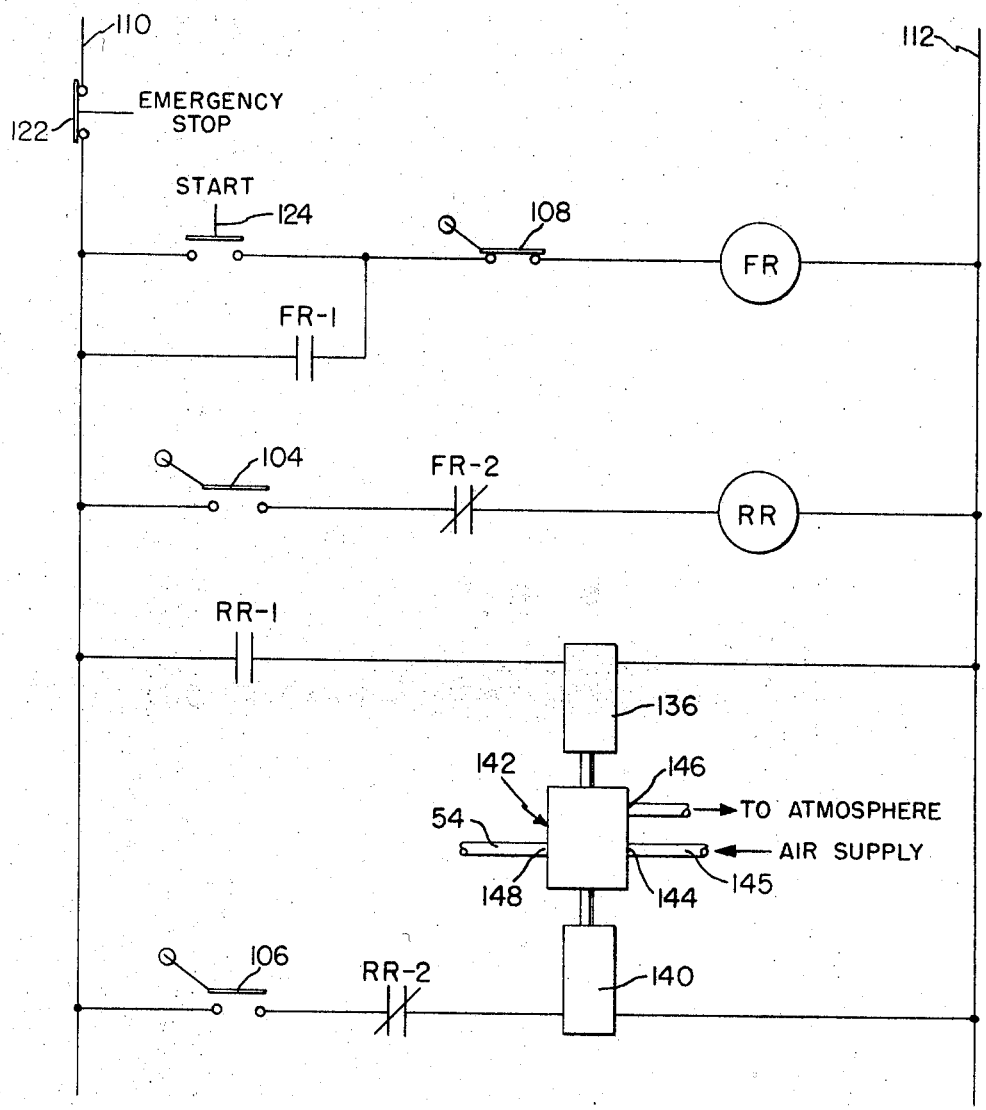
FIG. 4 is a diagram of an electrical control system for the apparatus of FIG. 1.

The switches 104, 106 and 108 are incorporated in an electrical control system illustrated in FIG. 4. The electrical system, illustrated in an off condition, comprises a pair of power lines 110 and 112. A normally closed emergency stop switch 122 is located in the power line 110 and when depressed, cuts off all power to the control system. A start switch 124 which is closed only while depressed, is connected in parallel with a pair of normally open holding contacts FR-1 of a relay FR. Connected in series with the start switch 124 and contacts FR-1 are the limit switch 108 and the forward relay FR. A reverse relay RR is connected in series with the limit switch 104 and a pair of normally closed holding contacts FR-2 of the relay FR. A pair of normally open holding contacts RR-1 of the relay RR are connected in series with a solenoid valve 136. The limit switch 106 is connected in series with a pair of normally closed holding contacts RR-2 of the relay RR and with a solenoid valve 140.

Also illustrated in FIG. 4 is a pneumatic control valve 142 responsive to solenoid valves 136 and 140. The control valve 142 comprises an inlet port 144 which pneumatically communicates with a pressurized air supply (not shown) by means of a suitable conduit 145, an exhaust port 146 and a delivery port 148 connected to pipe 54.

The cycle of operation of the control system is started by the operator momentarily depressing the start switch 124. This causes electrical current to flow from line 110 to line 112 through forward relay FR to; (1) start the motor 70 in the forward direction, (2) close and hold the holding contacts FR-1 to maintain current through the relay FR after the start switch 124 is released, and (3) opens the contacts FR-2. As the motor 70 drives the shaft 78 forward, the cam or actuator 102 moves off the limit switch 104 and the limit switch 104 (which was originally open) closes. This, however, does not cause electrical current to flow through the reverse relay RR since at this time the forward relay FR will hold the contacts FR-2 open.

As the shaft 78 continues forward, the cam or actuator 102 will engage and close the limit switch 106. This will cause electrical current to flow through the solenoid valve 140 since the contacts RR-2 are normally closed. The solenoid valve 140 is thus actuated and operates the control valve 142 to cause pressurized air to flow into pipe 54.

The shaft 78 continues forward until the cam or actuator 102 strikes the limit switch 108 and momentarily stops the current flow to the forward relay FR. This deactivates the forward relay FR which; (1) shuts off the motor 70, (2) allows the contacts FR-1 to open, and (3) allows the contacts FR-2 to close and cause current to flow to the reverse relay RR since the limit switch 104 was closed at the beginning of the cycle.

When the reverse relay RR is actuated, it causes; (1) the drive motor 70 to be reversed, (2) the normally open contacts RR-1 to be closed thereby actuating the solenoid valve 136, and (3) the normally closed contacts RR-2 to be opened thereby deactuating solenoid valve 140.

The motor 70 being thus reversed draws the shaft 78 back toward its original position causing the cam or actuator 102 to be drawn away from limit switch 108 allowing it to close. This will not, however, cause current to flow to the forward relay FR since the start switch 124 and the contacts FR-1 are open. The solenoid valve 140 operates the pneumatic valve 142 to shut off the pressurized air supply, and the solenoid valve 136 operates the pneumatic valve 142 to release the air in pipe 54 through the exhaust port 146.

As the shaft 78 continues back toward its original position, the cam 102 will engage the limit switch 106 and open it again. Since the contacts RR-2 are already open, opening the limit switch 106 has no effect on the solenoid valve 140.

When the shaft 78 has reached its original position, the cam or actuator 102 will engage the limit switch 104 and hold it in the open position interrupting the current to the reverse relay RR. The reverse relay RR being thus deenergized; (1) the motor 70 is stopped, (2) the contacts RR-1 are opened, and (3) the contacts RR-2 are closed. When the contacts RR-1 are opened, the solenoid valve 136 is deactivated and closes the exhaust port 146 isolating the pipe 54 again. At this point, the cycle is complete and ready to be started again by the operator engaging the start button.

In the operation of the machine, a tire 10 is positioned by the operator generally coaxially with and between the bead-engaging members 46 and 86 with the bead 18 seated on bead seat 52. The drive means 66 is actuated to effect movement of the bead-engaging member 86 axially toward the bead 20 of the tire 10. When the bead 20 is seated on the bead seat 85, it seals the cavity 150 which is defined by the tire and the end closure means including the discs 40 and 80, the bead-engaging members or annular rings 46 and 86 and the ends of the shafts 34 and 78.

As the bead-engaging member 86 continues to move toward the bead-engaging member 46, the cam or actuator 102 trips the limit switch 106 and causes pressurized air to flow through the pipe 54 and passage 56 into the cavity 150 of the tire 10 resulting in radial expansion of the tread portion 12. As the bead-engaging members 46 and 86 come closer together, the sidewall deflectors 58 and 88 restrict the lateral movement of the sidewalls 14 and 16 of the tire 10 resulting in the sidewalls folding into a reentrant curve or fold 22 concentric with and underneath the tread portion 12. When the beads 18 and 20 have reached a predetermined spacing, the cam or actuator 102 actuates the limit switch 108 which effects release of the air in the cavity 150 and reversal of the drive motor 70. The air in the cavity being thus released, the tread 12 will contract tightly around the beads 18 and 20 and sidewalls 14 and 16 holding them in the folded configuration illustrated by the dotted line of FIG. 3. Depending on the flexibility of the tire, it is sometimes desirable to delay reversal of the motor 70 for up to 7 seconds after the air in the cavity 150 is released in order to allow time for the tread 12 to contract. Also the motor being thus reversed draws the bead-engaging member 86 back back towards its original position. As the bead-engaging member 86 continues back, either the bead 20 will slip off of the bead seat 85, or the bead 18 will slip off of the bead seat 52. When the shaft 78 reaches its original position, the cam or actuator 102 engages the switch 104 and effects deenergizing of the motor 70. The tire 10 can then be removed from the machine.

It will be apparent to one skilled in the art that although in this particular embodiment, the sidewall deflectors 58 and 88 are flat plates, other means may be used such as radially extending bars or a ring substantially larger in diameter than the bead-engaging members 46 and 86. It is necessary only that such sidewall deflectors restrict the tread and sidewalls from being displaced from a position centered with respect to the beads which will result in the sidewalls folding under the tread. The permitted adjustment of the axial distance between each bead-engaging member and its respective sidewall deflector provides flexibility in the use of the apparatus, particularly with respect to the folding of different size tires and how tightly the sidewalls are folded beneath the tread. The provision for removing the bead-engaging members also provides flexibility in that different size bead-engaging members can be installed to accommodate the folding of different size tires on the same apparatus. Also, although in the particular embodiment disclosed, 4 p.s.i.g. pressurized air was used to radially expand the tread 12, any pressure from slight, in the range of one-half p.s.i.g., all the way up to normal tire operating pressure can be used without adverse effect on the folding operation.

It should be further noted that while only one bead-engaging member is movable in the particular embodiment described, one skilled in the art will readily recognize that both bead-engaging members could be movable. Also, while the drive means illustrated is a jackscrew arrangement, any other suitable means could be used such as, by way of example only, a hydraulic ram or rack and pinion arrangement. Lastly, although in this particular embodiment the tread 12 is pneumatically expanded in the radial direction, one skilled in the art will readily recognize that the tread 12 could also be expanded by any appropriate mechanical means. In addition, mechanical expansion of the tread would eliminate the need for the bead-engaging members 46 and 86 to from an airtight seal with the beads 18 and 20.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. Apparatus for folding the sidewalls of a generally cylindrical cured tire comprising:
  a. a pair of spaced apart coaxially arranged bead-engaging members each having a bead seat thereon for engaging the beads of a tire so as to support the tire between said members;
  b. fluid means for radially expanding the tread portion of a tire supported by said members;
  c. a pair of sidewall deflectors respectively disposed entirely axially outside of the bead seats and coaxially of said pair of members, each sidewall deflector extending radially outwardly beyond the bead-engaging portion of the respectively associated bead-engaging member; and
  d. means supporting said bead-engaging members and sidewall deflectors for movement of at least one of said bead-engaging members and respectively associated sidewall deflector axially toward and away from the other bead-engaging member.

2. Apparatus as described in claim 1 further including means for axially adjusting each sidewall deflector relative to its respectively associated bead-engaging member.

3. In an apparatus as described in claim 1; a pair of closure means including said bead-engaging members for closing the ends of a tire supported between said bead-engaging members.

4. Apparatus as described in claim 3 wherein each closure means includes a disc disposed coaxially of a bead-engaging member, and means detachably mounting each bead-engaging member in airtight relation on its respective disc.

5. Apparatus as described in claim 2 wherein said sidewall deflectors are a pair of flat plates which extend substantially further radially outward than said bead-engaging members and further comprising: a pair of closure means, each of said closure means including a bead-engaging member detachably mounted in airtight relation to and coaxially with a disc; and drive means for moving said one bead-engaging member and respectively associated sidewall deflector axially toward and away from the other said bead-engaging member.

6. Apparatus as described in claim 1 further comprising: drive means for moving said one bead-engaging member and respectively associated sidewall deflector; means for effecting activation of said means for expanding said tread portion in response to movement of said one bead-engaging member and sidewall deflector into a first predetermined position during movement of said one bead-engaging member toward the other bead-engaging member; and means for effecting deactivation of said means for expanding said tread portion and effecting reversal of the movement of said one bead-engaging member in response to movement of said one bead-engaging member into a second predetermined position during movement of said one bead-engaging member toward said other bead-engaging member, said second predetermined position being spaced between said first predetermined position and said other bead-engaging member.

7. A method of folding the sidewalls of a generally cylindrical cured tire comprising the steps of:
  a. engaging the bead portions of the tire;
  b. applying a radial force to the tread area to expand said tread area radially outwardly;
  c. moving said bead portions axially inwardly a predetermined distance;
  d. restricting the tread and sidewalls from being displaced from a position centered with respect to the beads resulting in the sidewalls folding under the tread; and
  e. releasing said force from the tread area of the tire.